(12) United States Patent
Ishihara

(10) Patent No.: US 11,726,320 B2
(45) Date of Patent: Aug. 15, 2023

(54) INFORMATION PROCESSING APPARATUS, INFORMATION PROCESSING METHOD, AND PROGRAM

(71) Applicant: SONY CORPORATION, Tokyo (JP)

(72) Inventor: Atsushi Ishihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/260,088

(22) PCT Filed: Jul. 30, 2019

(86) PCT No.: PCT/JP2019/029783
§ 371 (c)(1),
(2) Date: Jan. 13, 2021

(87) PCT Pub. No.: WO2020/044916
PCT Pub. Date: Mar. 5, 2020

(65) Prior Publication Data
US 2021/0271075 A1    Sep. 2, 2021

(30) Foreign Application Priority Data

Aug. 29, 2018 (JP) .................................. 2018-160161

(51) Int. Cl.
*G02B 27/00* (2006.01)
*G02B 27/01* (2006.01)
*G06T 7/20* (2017.01)

(52) U.S. Cl.
CPC ....... *G02B 27/0093* (2013.01); *G02B 27/017* (2013.01); *G06T 7/20* (2013.01);
(Continued)

(58) Field of Classification Search
CPC ............. G02B 27/0093; G02B 27/017; G02B 2027/0118; G02B 2027/0147; G06T 7/20;
(Continued)

(56) References Cited

U.S. PATENT DOCUMENTS 10,078,218 B2 *   9/2018   Katz .................. G02B 27/0093
2014/0184475 A1 *  7/2014   Tantos ........... H04N 21/234318
                                                       345/8
(Continued)

FOREIGN PATENT DOCUMENTS

EP           3352050 A1    7/2018
EP           3379494 A1    9/2018
(Continued)

*Primary Examiner* — Bryan Earles
(74) *Attorney, Agent, or Firm* — Paratus Law Group, PLLC

(57) ABSTRACT

An information processing apparatus 1 acquires motion information regarding a user 700 who is a user, determines the image quality (for example, the resolution) of a virtual object on the basis of the acquired motion information, and controls the display of the virtual object on the basis of the determined image quality. The virtual object is displayed with low resolution, for example, when the user 700 is turning his/her head. On the other hand, the virtual object is displayed with high resolution when the user 700 is put in a stationary state, that is, when a change becomes zero. The information processing apparatus 1 makes it possible to reduce a drawing load, while maintaining a real expression.

16 Claims, 9 Drawing Sheets

(52) U.S. Cl.
CPC .......... *G02B 2027/0118* (2013.01); *G02B 2027/0147* (2013.01)

(58) Field of Classification Search
CPC ....... G09G 2320/0261; G09G 2340/04; G09G 2340/0407; G09G 2340/0414; G09G 2340/0421; G09G 2340/045; G09G 2354/00; G09G 5/00; G09G 5/36; G06F 3/011

See application file for complete search history.

(56) References Cited

U.S. PATENT DOCUMENTS

| | | | | |
|---|---|---|---|---|
| 2014/0267420 | A1* | 9/2014 | Schowengerdt | G02B 27/017 345/633 |
| 2014/0375680 | A1* | 12/2014 | Ackerman | G06T 19/006 345/633 |
| 2017/0109935 | A1 | 4/2017 | Löffler et al. | |
| 2017/0178408 | A1 | 6/2017 | Bavor, Jr. et al. | |
| 2017/0316601 | A1* | 11/2017 | Kakarlapudi | G06T 15/005 |
| 2018/0059777 | A1* | 3/2018 | Kobayashi | G06F 3/038 |
| 2019/0130631 | A1* | 5/2019 | Gebbie | G06T 7/73 |
| 2019/0243355 | A1* | 8/2019 | Izu | H04N 21/234381 |
| 2019/0287495 | A1* | 9/2019 | Mathur | G02B 27/0093 |
| 2021/0090311 | A1* | 3/2021 | Hoover | G06V 40/193 |

FOREIGN PATENT DOCUMENTS

| | | | |
|---|---|---|---|
| JP | 2000-348201 | A | 12/2000 |
| JP | 2005-275797 | A | 10/2005 |
| JP | 2011-091789 | A | 5/2011 |
| JP | 2016-157458 | A | 9/2016 |
| JP | 2016-527536 | A | 9/2016 |
| JP | 2016-208380 | A | 12/2016 |
| JP | 2017-091483 | A | 5/2017 |
| WO | WO 2015/145541 | A1 | 10/2015 |
| WO | WO 2017/135129 | A1 | 8/2017 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/029783 (filed on Jul. 30, 2019) under 35 U.S.C. § 371, which claims priority to Japanese Patent Application No. 2018-160161 (filed on Aug. 29, 2018), which are all hereby incorporated by reference in their entirety.

TECHNICAL FIELD

The present technology relates to an information processing apparatus, an information processing method, and a program.

BACKGROUND ART

In recent years, technologies to display video having a sense of reality have been provided as information processing technologies and display technologies are developed. Such technologies include an AR (Augmented Reality) technology. The AR technology is a technology to present, to users, additional information items in a state of being superimposed on the real world. The information items presented to users by the AR technology are also called annotations and visualized as virtual objects having various shapes such as text, icons, and animation.

The AR technology described above is realized by, for example, head mounted displays (hereinafter called "HMDs") attached to the heads or the like of users. Specifically, the HMDs have a display positioned in front of the eyes of users when worn by the users and display virtual objects described above in front of the eyes of the users. Such HMDs include a nontransparent type in which the above display is nontransparent and a transparent type in which the above display is transparent. When the display is transparent, virtual objects described above are displayed in real time to be superimposed on real space visually recognized by users. According to the AR technology, virtual objects are displayed in the manner described above, whereby it is possible to make users perceive the virtual objects as if the virtual objects were real objects existing in real space. For example, HMDs using such a transparent display are disclosed in the following Patent Literatures 1 and 2. In addition, since the HMDs are attached to the heads or the like of users, the HMDs have a compact shape.

CITATION LIST

Patent Literature

Patent Literature 1: Japanese Patent Application Laid-open No. 2016-208380
Patent Literature 2: Japanese Patent Application Laid-open No. 2016-157458

DISCLOSURE OF INVENTION

Technical Problem

In such information processing apparatuses, drawing loads increase as objects are expressed in a more realistic way, and various problems occur due to the drawing loads.

In view of the above circumstances, the present technology has an object of providing an information processing apparatus, an information processing method, and a program capable of reducing drawing loads, while maintaining realistic expressions.

Solution to Problem

In order to achieve the above object, an information processing apparatus according to an embodiment of the present technology includes: an acquisition unit that acquires motion information regarding a user; a determination unit that determines image quality of a virtual object on the basis of the motion information acquired by the acquisition unit; and a display control unit that controls display of the virtual object on the basis of the image quality determined by the determination unit.

An information processing method according to an embodiment of the present technology includes: acquiring motion information regarding a user; determining image quality of a virtual object on the basis of the acquired motion information; and controlling display of the virtual object on the basis of the determined image quality.

A program according to an embodiment of the present technology causes a computer to perform a process including: acquiring motion information regarding a user; determining image quality of a virtual object on the basis of the acquired motion information; and controlling display of the virtual object on the basis of the determined image quality.

Advantageous Effects of Invention

As described above, it is possible to reduce drawing loads, while maintaining realistic expressions according to the present technology. Note that the effect described here should not be interpreted in a limited way, and any effect described in the present disclosure may be produced.

MODE(S) FOR CARRYING OUT THE INVENTION

Hereinafter, suitable embodiments of the present disclosure will be described in detail with reference to the accompanying drawings.

<<Schematic Configuration of Information Processing Apparatus According to Embodiment of Present Disclosure>>

Figure 1:
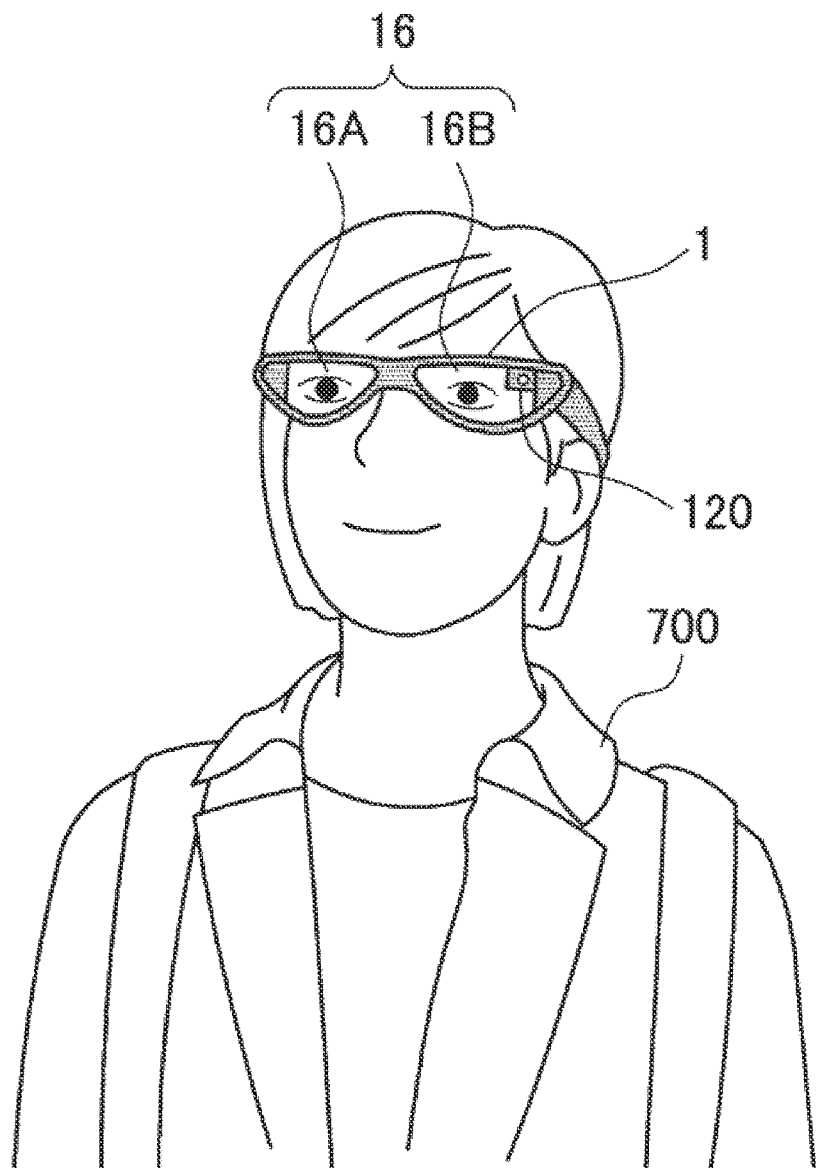
FIG. 1 is a view for describing the schematic configuration of an information processing apparatus 1 according to an embodiment of the present disclosure.

First, the general outline of an information processing apparatus according to an embodiment of the present disclosure will be described with reference to FIG. 1. FIG. 1 is a view for describing the schematic configuration of an information processing apparatus 1 according to the present embodiment. As shown in FIG. 1, the information processing apparatus 1 according to the present embodiment is realized by, for example, an eyeglass-type HMD attached to the head of a user 700. That is, the information processing apparatus 1 is a wearable apparatus worn by the user 700. A display unit 16 corresponding to an eyeglass lens portion positioned in front of the eyes of the user 700 when worn may include a transparent-type display that allows the visual recognition of the outside of the eyeglass lens portion or a nontransparent-type display that does not allow the visual recognition of the outside of the eyeglass lens portion. Note that a HMD having the display unit 16 that is a transparent-type display will be called a "smart eyeglass" in the following description.

The information processing apparatus 1 according to the present embodiment is capable of presenting a virtual object in front of the eyes of the user 700 by displaying the virtual object on the display unit 16. Note that in the following description, the virtual object represents a virtual object perceivable by the user 700 like a real object existing in real space. In addition, in the present embodiment, the HMD that is an example of the information processing apparatus 1 is not limited to a mode in which a virtual object is displayed with respect to both eyes of the user 700 but may include a mode in which a virtual object is displayed with respect to only one eye of the user 700.

A case in which the information processing apparatus 1 is a smart eyeglass will be described as an example. As shown in FIG. 1, the information processing apparatus 1 attached to the head of the user 700 has a configuration in which a pair of display units 16A and 16B for right and left eyes, respectively, is arranged in front of the eyes of the user 700. Transmission-type displays are, for example, used as the display units 16A and 16B. By controlling the transmittance of the transparent-type displays, the information processing apparatus 1 is capable of making display transparent, that is, bringing the display into a transparent or semi-transparent state. Further, since the display units 16A and 16B are made transparent, the user 700 is capable of perceiving surrounding real space when wearing the information processing apparatus 1 like eyeglasses at all times. Therefore, the daily life of the user 700 is not hindered. In addition, the display units 16A and 16B are capable of displaying images such as text and graphics, while remaining transparent. That is, the display units 16A and 16B are capable of displaying a virtual object in a state of being superimposed on real space as augmented reality (AR). Such transparent displays hold virtual optical systems including transparent light guide units or the like in front of the eyes of the user 700 using, for example, half mirrors or transparent light guide plates and display a virtual object inside the virtual optical systems.

Note that when nontransparent-type displays are used in the present embodiment, the display unit 16 may display a virtual object in a state of being superimposed on an image of real space, while displaying the image of the real space that is captured by an outward-looking camera 120 (that will be described in detail later) provided in the information processing apparatus 1.

In addition, in the present embodiment, the display unit 16 may be realized as a LED (Light Emitting Diode) light source or the like that directly projects images on the retinas of the user 700. That is, the information processing apparatus 1 may be realized as a projection-type HMD.

Further, various content can be displayed on the display unit 16 as a virtual object. The virtual object may include, for example, markers (such as signs) schematically showing information presented to the user 700, maps, shapes (such as persons, telephones, and name boards) schematically showing real objects, or the like. In addition, the virtual object may include moving-image content such as movies and video clips, still-image content captured by a digital still camera or the like, data of digital books or the like, or the like. That is, content that can be displayed as the virtual object may include any content that can be displayed.

The information processing apparatus 1 is provided with the outward-looking camera 120 that captures images of real space around the user 700. Specifically, the outward-looking camera 120 is installed in the information processing apparatus 1 so as to capture, in a state in which the user 700 wears the information processing apparatus 1, images of real space in a direction visually recognized by the user 700 as an imaging range. Note that when a plurality of outward-looking cameras 120 is provided, a depth image (distance image) can be acquired from information regarding parallax obtained by the outward-looking cameras 120. Therefore, the information processing apparatus 1 is capable of recognizing information regarding surrounding environments, for example, the shapes and the positional relationships of real objects existing in real space, or the like.

In addition, although not shown in FIG. 1, the information processing apparatus 1 may be provided with an inward-looking camera 122 (see FIG. 2) that captures images of the facial expressions of the user 700 when worn. Specifically, the inward-looking camera 122 is installed in the information processing apparatus 1 so as to capture, in a state in which the user 700 wears the information processing apparatus 1, images of the facial expressions of the user 700 or images of both eyes of the user 700 as imaging ranges. Note that when a plurality of inward-looking cameras 122 is provided, the information processing apparatus 1 is capable of accurately recognizing the positions of the eyes, the positions of the pupils, the directions and motions of the visual lines, or the like of the user 700 from information regarding parallax obtained by the outward-looking cameras 120.

Further, although not shown in FIG. 1, the information processing apparatus 1 may be provided with various sensors such as a microphone 124 (hereinafter called a "microphone") (see FIG. 2) that acquires sound or the like. In addition, although not shown in FIG. 1, the information processing apparatus 1 may be provided with a speaker 18 (see FIG. 2). For example, the speaker 18 may be realized by a pair of earphone speakers corresponding to the right and left ears of the user 700. Further, the information processing apparatus 1 may be provided with a plurality of the same types of sensors like this.

Although not shown in FIG. 1, the information processing apparatus 1 may be provided with buttons, switches, or the like (showing an example of an operation input unit) used by the user 700 to perform an input operation. In addition, as an input operation performed by the user 700 for the information processing apparatus 1, not only an operation for buttons or the like but also various input modes such as input by sound, gesture input by hands or a head, and input by visual lines are available. Note that the input operations by these various input modes can be acquired by various sensors provided in the information processing apparatus 1.

Note that in the present embodiment, the shape of the information processing apparatus 1 is not limited to an example shown in FIG. 1. For example, the information processing apparatus 1 may include a headband-type HMD or a helmet-type (for example, a visor portion of a helmet corresponds to a display) HMD. That is, in the present embodiment, the information processing apparatus 1 is a wearable apparatus wearable by the user 700, and its shape is not particularly limited so long as the information processing apparatus 1 has the display unit 16 positioned in front of the eyes of the user 700 when worn. Note that the headband-type HMD described above represents a type attached by a band orbiting around the circumference of the head of the user 700. Further, the headband-type HMD also includes a band passing through not only the temporal region of the head but also the parietal region of the head of the user 700.

Note that as described above, a case in which the information processing apparatus 1 is a HMD called a smart eyeglass having a transparent-type display will be described as an example.

<<Technical Background of Present Disclosure>>

The general outline of the information processing apparatus 1 according to the present embodiment is described above. Next, the technical background of the information processing apparatus 1 will be described.

As described above, the information processing apparatus 1 according to the present embodiment displays a virtual object in a state of being superimposed on real space. Further, the virtual object can be expressed in a more realistic way in the real space with an increase in the resolution of the virtual object.

However, a drawing time per unit time becomes longer in the information processing apparatus 1 as a virtual object is expressed in a more realistic way, which in turn reduces a display frame rate. For example, a reduction in quality such as a dropping frame is caused in animation. Particularly, compared with a case in which the user 700 is seeing a virtual object while remaining stationary, the virtual object is displayed so as to move in a case in which the user 700 is in motion, a case in which the user 700 is typically moving or moving the eyes restlessly, or the like. Therefore, the user 700 does not overlook a reduction in quality such as the above dropping frame in some cases.

Besides, a great amount of the resource of a processor is requested as a virtual object is expressed in a more realistic way in the information processing apparatus 1, which in turn increases a calorific value. For example, a reason for stopping the processor is caused, or the user 700 faces an increased risk for burning. Particularly, since the information processing apparatus 1 including a HMD as described above is attached to the head of the user 700, the risk of burning has to be avoided.

In addition, a great amount of the resource of the processor is requested as a virtual object is expressed in a more realistic way in the information processing apparatus 1, which in turn increases power consumption per unit time and heavily consumes a battery, for example. Particularly, since the information processing apparatus 1 including a HMD as described above or the like is attached to the head of the user 700, the information processing apparatus 1 has a compact shape. In order to make the shape of the information processing apparatus 1 compact, the capacity of the battery loaded in the information processing apparatus 1 is restricted. Accordingly, the performance of the processor or the like, the allowance of a calorific value by processing, or the like is also restricted.

Therefore, in view of the technical background described above, the present inventors have led to the creation of the information processing apparatus 1 according to the embodiment of the present disclosure that acquires motion information regarding the user (user 700), determines the image quality of a virtual object on the basis of the acquired motion information, and controls the display of the virtual object on the basis of the determined image quality. That is, with attention paid to the point that, compared with a case in which the user 700 is seeing a virtual object while remaining stationary, the visual recognition of a small portion of the virtual object is difficult but the visual recognition of a reduction in image quality such as a dropping frame becomes easy in a case in which the user 700 is in motion, the image quality of the virtual object is intentionally reduced when the user 700 is in motion. In this manner, a drawing time per unit time is prevented from being long when the user 700 is in motion, whereby a reduction in a display frame rate can be prevented to suppress a reduction in quality such as a dropping frame, and a scene in which a great amount of the resource of the processor is requested or a scene in which power consumption per unit time increases can be avoided as much as possible. Note that a drawing load generally reduces with a reduction in resolution when image quality represents the resolution. Therefore, the extent of a problem resulting from the resolution lessens when the display of a virtual object is controlled by the resolution on the basis of motion information regarding the user 700 in the information processing apparatus 1 according to the present embodiment.

Embodiment

The technical background of the present disclosure is described above. Next, the embodiment of the present disclosure will be described. In the present embodiment, the information processing apparatus 1 acquires motion information regarding the user who is a user (for example, a change in the position or the posture of the user 700), determines the image quality (for example, resolution) of a virtual object on the basis of the acquired motion information, and controls the display of the virtual object on the basis of the determined image quality.

For example, the user 700 wearing the information processing apparatus 1 sees a state in which a virtual object is displayed in a state of being superimposed at the center of real space. When the user 700 turns his/her head to the left in the state, the virtual object moves in the right direction of the real space. The information processing apparatus 1 acquires the movement speed of the virtual object as a change in the position or the posture of the user 700 and determines the resolution of the virtual object on the basis of the acquired change. The virtual object is displayed with the resolution. For example, the virtual object is displayed with low resolution when the user 700 is turning the head. On the other hand, the virtual object is displayed with high resolution when the user 700 is put in a stationary state, that is, when the change becomes zero. Further, the virtual object is displayed with resolution corresponding to a speed at which the user 700 turns the head, that is, resolution corresponding to the change. For example, the virtual object is displayed with low resolution when the speed of the change is fast and displayed with high resolution when the speed of the change is slow. In this manner, according to the present embodiment, the information processing apparatus 1 prevents a reduction in a display frame rate when the user 700 is in motion to suppress a reduction in quality such as a dropping frame, and reduces a scene in which a great amount of the resource of the processor is requested or a scene in which power consumption per unit time increases as much as possible.

<Detailed Configuration of Information Processing Apparatus According to Embodiment>

Figure 2:
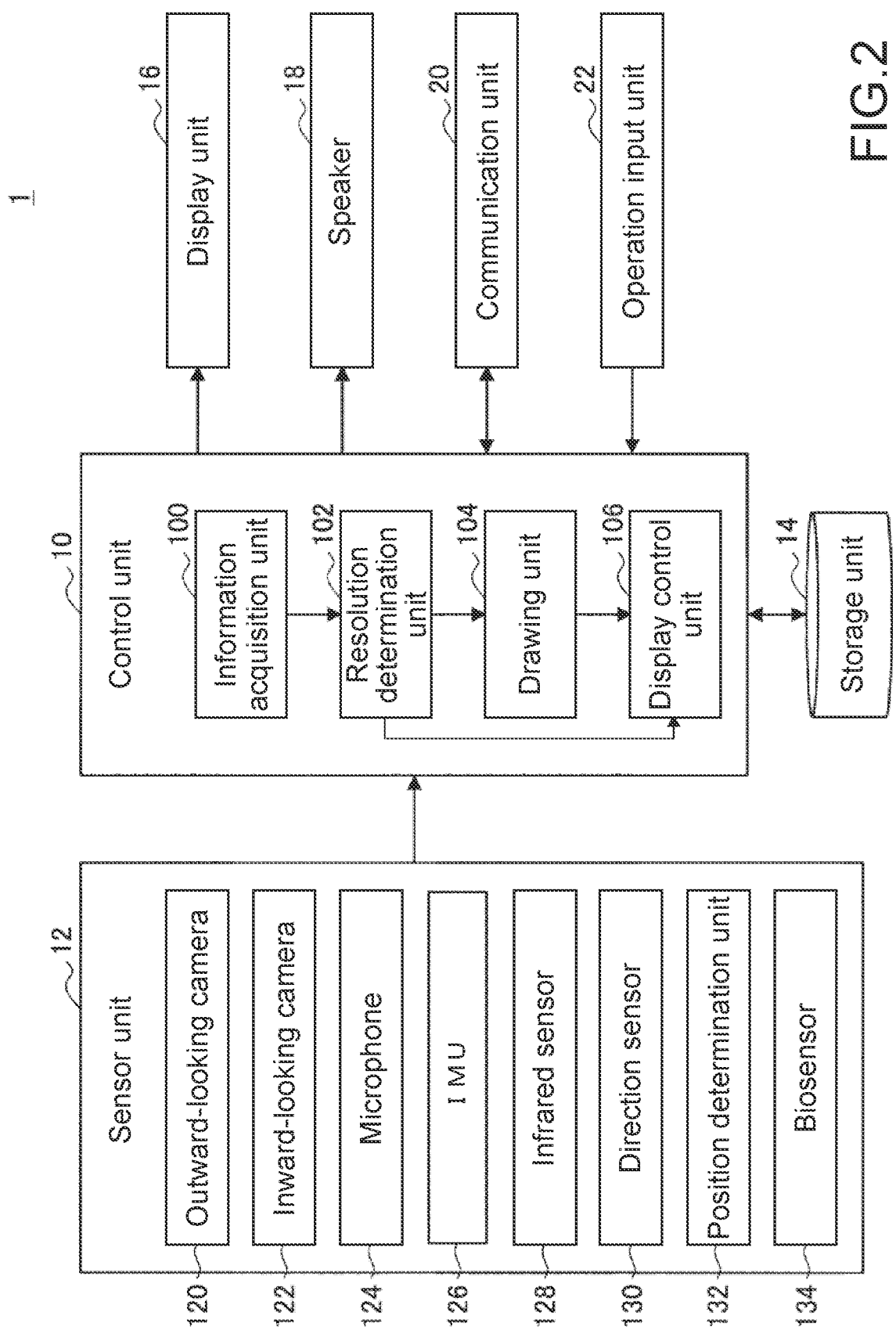
FIG. 2 is a block diagram showing an example of the detailed configuration of the information processing apparatus 1 according to the embodiment.

First, the detailed configuration of the information processing apparatus 1 according to the present embodiment will be described with reference to FIG. 2. FIG. 2 is a block diagram showing an example of the detailed configuration of the information processing apparatus 1 according to the present embodiment.

As shown in FIG. 2, the information processing apparatus 1 mainly has a control unit 10, a sensor unit 12, a storage unit 14, a display unit 16, a speaker 18, a communication unit 20, and an operation input unit 22. Hereinafter, the details of the respective function units of the information processing apparatus 1 will be described.

(Control Unit 10)

The control unit 10 functions as a computation processor and a controller and controls a general operation inside the information processing apparatus 1 according to various programs. The control unit 10 is realized by the electronic circuit of a microprocessor such as a CPU and a GPU. Further, the control unit 10 may include a ROM (Read Only Memory) that stores a program that is to be used, a computation parameter, or the like, a RAM (Random Access Memory) that temporarily stores a parameter that changes as occasion demands, or the like. For example, the control unit 10 performs control to dynamically change the display resolution or the like of a virtual object according to a change in the position or the posture of the user 700. Specifically, as shown in FIG. 2, the control unit 10 according to the present embodiment is capable of functioning as an information acquisition unit 100, a resolution determination unit 102, a drawing unit 104, and a display control unit 106. The details of the respective blocks of the control unit 10 will be described below.

Information Acquisition Unit 100

The information acquisition unit 100 is capable of acquiring information regarding the user 700 or various states around the user 700 using a detection result detected by the sensor unit 12 that will be described later. Specifically, the information acquisition unit 100 is capable of including, for example, a user's position and posture recognition engine that recognizes the position, the posture, or the state of the user 700, a SLAM (Simultaneous Localization And Mapping) recognition engine that identifies the position of the user 700, and a depth recognition engine that recognizes depth information in real space around the user 700.

In addition, the information acquisition unit 100 is capable of including a visual line recognition engine that detects the visual line of the user 700, a sound recognition engine that recognizes the sound of the user 700 or an environment around the user 700, a position recognition engine that recognizes the absolute position of the information processing apparatus 1 (the user 700), or the like. Further, the information acquisition unit 100 may include a real object recognition engine that recognizes a real object in real space, or the like. Note that each of the recognition engines is only an example, and the present embodiment is not limited to the recognition engines.

Specifically, the user's position and posture recognition engine recognizes the position or the posture of the head or the like of the user 700 (including the direction or the inclination of the face with respect to the body) using a detection result detected by the sensor unit 12. For example, the user's position and posture recognition engine functions as a self-position and posture estimation unit that estimates the position or the posture of the user 700 using an image captured by the outward-looking camera 120 that is a stereo camera and gyro information, acceleration information, or the like acquired by an IMU (Inertial Measurement Unit) 126 that will be described later. Further, the user's position and posture recognition engine may recognize the posture or the like of the user 700 using direction information or the like acquired by a direction sensor that will be described later. Note that a generally-known algorithm can be used as an algorithm for recognizing the position or the posture or the like of the user 700 and the algorithm is not particularly limited to a specific one in the present embodiment.

The SLAM recognition engine simultaneously performs the estimation of the self-position of the information processing apparatus 1 (the user 700) and the generation of the map of real space around the user 700 using a detection result detected by the sensor unit 12 and identifies the position of the information processing apparatus 1 in the real space. For example, the SLAM recognition engine (Particularly, Visual SLAM) sequentially restores the three-dimensional shape of a captured real object on the basis of an image captured by the outward-looking camera 120. Then, by associating a restoration result with the detection result of the position and the posture of the outward-looking camera 120, the SLAM recognition engine performs the generation of the map of real space around the user 700 and the estimation of the position and the posture of the outward-looking camera 120 (the user 700) in the real space. Note that it is also possible to estimate the position and the posture of the outward-looking camera 120 as information indicating a relative change on the basis of, for example, an image captured by the outward-looking camera 120 that is a stereo camera provided in the sensor unit 12 and detection results detected by various sensors such as the inertial measurement unit 126. Further, a generally-known algorithm can be used as an algorithm for recognizing SLAM and the algorithm is not particularly limited to a specific one in the present embodiment.

The depth recognition engine recognizes depth information in real space around the user 700 using a detection result detected by the sensor unit 12. Specifically, using a ToF (Time of Flight) system, the depth recognition engine is capable of recognizing the distance between the sensor unit 12 and a real object and information (depth information) on a shape such as an irregularity in real space on the basis of the measurement result of a time at which reflected light is returned from the real object. Further, the depth recognition engine may recognize the position and the shape of a real object in real space on the basis of a difference in the real object (binocular parallax) on a plurality of captured images in a case in which the same real space is regarded as an imaging target from different visual points of a plurality of the outward-looking cameras 120. Note that a generally-known algorithm may be used as an algorithm for recognizing depth information and the algorithm is not particularly limited to a specific one in the present embodiment.

Note that the information acquisition unit 100 is also capable of performing spatial recognition (spatial comprehension) on the basis of both the recognition result of the depth recognition engine and the recognition result of the SLAM recognition engine that are described above and recognizing the position and the posture of the information processing apparatus 1 (the position and the posture of the HMD or the user 700 wearing the HMD) in three-dimensional real space around the user 700.

The visual line recognition engine detects the visual line of the user 700 using a detection result detected by the sensor unit 12. For example, the visual line recognition engine analyzes images of the eyes of the user 700 that are captured by the inward-looking camera 122 to recognize the direction of the visual line of the user 700. Note that an algorithm for detecting a visual line is not particularly limited in the present embodiment but it is possible to recognize the direction of the visual line of the user 700 on the basis of, for example, the positional relationship between the inner corners of the eyes and irises or the positional relationship between reflection at corneas and pupils.

The sound recognition engine recognizes the sound of the user 700 or an environment around the user 700 using a detection result detected by the sensor unit 12. For example, the sound recognition engine is capable of performing noise reduction, sound source separation, or the like with respect to information regarding sound collected by the microphone 124 that will be described later and performing sound recognition, morphological analysis, sound source recognition, noise level recognition, or the like. Further, the sound recognition engine may extract a prescribed word from recognized sound information.

The position recognition engine recognizes the absolute position of the information processing apparatus 1 (the user 700) using a detection result detected by the sensor unit 12. For example, the position recognition engine is capable of recognizing a location (such as a station, a school, and a house) at which the information processing apparatus 1 exists on the basis of position information determined by a position determination unit 132 that will be described later and map information that is acquired in advance.

The real object recognition engine has the function of recognizing a real object on the basis of an image or the like captured by the outward-looking camera 120 or the like. For example, the real object recognition engine recognizes the type or the like of a real object by identifying the feature amount of the real object calculated from an image captured by the outward-looking camera 120 with the feature amount of the real object that is registered in advance. Note that the above feature amount can be calculated by a known feature amount calculation technology such as a SIFT (Scale-Invariant Feature Transform) method and a Random Ferns method.

Note that the information acquisition unit 100 may acquire apparatus profiles (such as a display processing speed, the detection state of the sensor unit 12, and recognition frame rates in the various recognition engines described above) indicating the state of processing in the information processing apparatus 1. In addition, the information acquisition unit 100 may acquire the display position, the display area, the display number, and the display mode (such as the type of content displayed as a virtual object and the movement speed of the displayed virtual object) that are defined in an application that displays the virtual object.

Resolution Determination Unit 102

On the basis of information regarding the self-position and the posture of the user 700 that is acquired by the information acquisition unit 100, the resolution determination unit 102 calculates a change in the position or the posture of the user 700 (for example, a difference in the self-position or the posture between a previous frame and a current frame, a difference in the self-position or the posture per unit time, that is, the speed of a change).

For example, the resolution determination unit 102 acquires information regarding a change in the self-position and the posture of the user 700 on the basis of the difference between a first display position of a virtual object 800 displayed at a first timing and a second display position of the virtual object 800 displayed at a second timing later than the first timing. In other words, for example, the resolution determination unit 102 monitors the difference between a past display frame and a current display frame that are displayed on the display unit 16 and calculates a change in the position or the posture of the user 700 on the basis of a monitoring result. More specifically, for example, the resolution determination unit 102 monitors a difference in the position between the virtual object 800 in a previous display frame and the virtual object 800 in a current display frame that are displayed on the display unit 16, for example, a pixel value obtained when the virtual object 800 moves per unit time and regards the pixel value per unit time as the speed of a change in the position or the posture of the user 700.

Note that a change in the position or the posture of the user 700 is calculated on the basis of a difference in the position of the virtual object 800 in the above example but may be calculated on the basis of, for example, the position of another object identifiable in the display unit 16. Typically, the resolution determination unit 102 may perform processing to extract an object in real space that is displayed on the display unit 16, for example, a characteristic object and calculate a change in the position or the posture of the user 700 on the basis of a difference in the position or the posture of the characteristic object.

Further, the above calculation method using a display object is an example, and the present embodiment is not limited to the method. For example, the resolution determination unit 102 may directly calculate a change in the position or the posture of the user 700 on the basis of an image captured by the outward-looking camera 120 that is a stereo camera and a change in measured acceleration acquirable from the inertial measurement unit 126. Further, the resolution determination unit 102 may directly calculate a change in the position or the posture of the user 700 on the basis of a change in a self-position calculated from the above SLAM (Simultaneous Localization And Mapping) recognition engine.

In addition, the resolution determination unit 102 may directly calculate a change in the position or the posture of the user 700 on the basis of a change in a self-position calculated from an infrared sensor when the infrared sensor is mounted in the sensor unit 12. Further, the resolution determination unit 102 may directly calculate a change in the position or the posture of the user 700 on the basis of a change in a self-position calculated from a laser range scanner when the laser scanner is mounted in the sensor unit 12. Note that the information processing apparatus 1 of the present embodiment may calculate a change in the position or the posture of the user 700 by the combination of the various means described above.

The resolution determination unit 102 determines the resolution of the display unit 16, that is, the resolution of the virtual object 800 displayed on the display unit 16 on the basis of a calculated change in the self-position or the posture of the user 700, gives instructions to perform drawing with the determined resolution to the drawing unit 104, and gives instructions to perform display control with the determined resolution to the display control unit 106.

Figure 3:
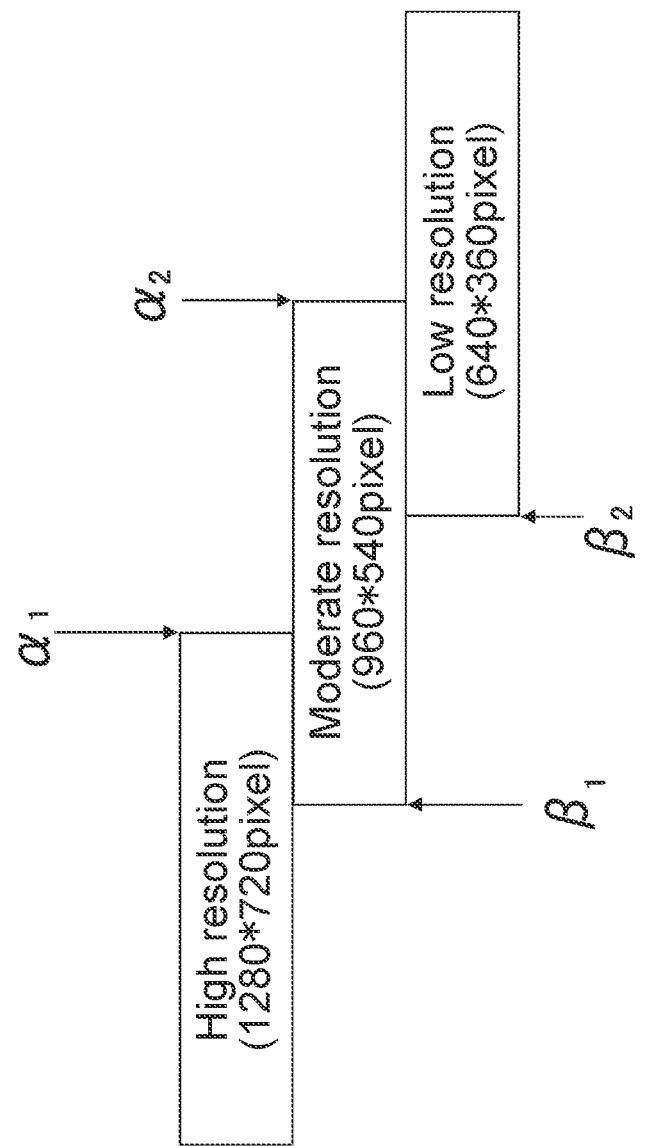
FIG. 3 is a conceptual view for describing the operation of determining resolution by a resolution determination unit 102 according to the embodiment.

FIG. 3 is a conceptual view for describing the operation of determining resolution by the resolution determination unit 102 according to the present embodiment.

The resolution determination unit 102 according to the present embodiment determines the resolution of the virtual object 800 from first resolution (1280×720 pixels), second resolution (960×540 pixels), and third resolution (640×360 pixels) on the basis of a change in the position or the posture (a difference in the self-position and/or the posture when compared with a previous frame) of the user 700. The resolution 1280×720 pixels, 960×540 pixels, and 640×360 pixels indicate resolution on the coordinates of the display unit 16, that is, resolution on screen coordinates. When the user 700 is put in a stationary state, the resolution determination unit 102 selects the first resolution (for example, 1280×720 pixels) as high resolution. When the user 700 is in motion, the resolution determination unit 102 selects the second resolution (for example, 960×540 pixels) as moderate resolution or the third resolution (for example, 640×360 pixels) as low resolution according to the speed of the user 700. Note that the resolution may be controlled in the same manner not only for a two-dimensional display but also for a three-dimensional display.

The storage unit 14 has a threshold table retaining a first threshold for motion information and a second threshold for the motion information that is smaller than the first threshold, the first threshold being used by the resolution determination unit 102 to make a determination to decrease the resolution of a virtual object from the first resolution to the second resolution, the second threshold being used by the resolution determination unit 102 to make a determination to increase the resolution of the virtual object from the second resolution to the first resolution. Then, the resolution determination unit 102 determines the resolution of the virtual object on the basis of the comparison between the acquired motion information and the first threshold and the second threshold.

Specifically, the threshold table of the storage unit 14 stores a first threshold $\alpha_1$, a second threshold $\alpha_2$, a third threshold $\beta_1$, and a fourth threshold $\beta_2$. The resolution determination unit 102 determines resolution by the comparison between a calculated change in the position or the posture of the user 700 and the thresholds ($\alpha_1$, $\alpha_2$, $\beta_1$, and $\beta_2$) stored in the storage unit 14.

The first threshold $\alpha_1$ is a threshold for decreasing resolution and used to determine whether a change in the position or the posture of the user 700 in an x coordinate or a y coordinate on, for example, the screen coordinates of 1280×720 pixels that indicate the first resolution becomes 15 pixels or more per unit time when compared with a previous frame. When the resolution of the previous frame is the first resolution (1280×720 pixels) and the change becomes 15 pixels or more, the resolution determination unit 102 makes a determination to decrease the resolution from the first resolution (1280×720 pixels) to the second resolution (960×540 pixels).

The second threshold $\alpha_2$ is a threshold for decreasing resolution and used to determine whether a change in the position or the posture of the user 700 in the x coordinate or the y coordinates on, for example, the screen coordinates of 1280×720 pixels that indicate the first coordinates becomes 30 pixels or more per unit time when compared with a previous frame. When the resolution of the previous frame is the first resolution (1280×720 pixels) or the second resolution (960×540 pixels) and the change becomes 30 pixels or more, the resolution determination unit 102 makes a determination to decrease the resolution from the first resolution (1280×720 pixels) or the second resolution (960×540 pixels) to the third resolution (640×360 pixels).

The third threshold $\beta_1$ is a threshold for decreasing resolution and used to determine whether a change in the position or the posture of the user 700 in the x coordinate or the y coordinate on, for example, the screen coordinates of 1280×720 pixels that indicate the first coordinates becomes less than 10 pixels per unit time when compared with a previous frame. When the resolution of the previous frame is the second resolution (960×540 pixels) or the third resolution (640×360 pixels) and the change becomes 10 pixels or less, the resolution determination unit 102 makes a determination to increase the resolution from the second resolution (960×540 pixels) or the third resolution (640×360 pixels) to the first resolution (1280×720 pixels).

The fourth threshold $\beta_2$ is a threshold for decreasing resolution and used to determine whether a change in the position or the posture of the user 700 in the x coordinate or the y coordinate on, for example, the screen coordinates of 1280×720 pixels that indicate the first coordinates becomes less than 20 pixels per unit time when compared with a previous frame. When the resolution of the previous frame is the third resolution (640×360 pixels) and the change becomes 20 pixels or less, the resolution determination unit 102 makes a determination to increase the resolution from the third resolution (640×360 pixels) to the second resolution (960×540 pixels).

The information processing apparatus 1 according to the present embodiment makes the first threshold $\alpha_1$ and the third threshold $\beta_1$ different from each other and makes the second threshold $\alpha_2$ and the fourth threshold $\beta_2$ different from each other among the resolution decrease thresholds (the first and second thresholds $\alpha_1$ and $\alpha_2$) for decreasing resolution and the resolution increase thresholds (the third and fourth thresholds $\beta_1$ and $\beta_2$) for increasing resolution. In this manner, the resolution of the virtual object 800 frequently changes according to the motion of the user 700, and the user 700 can be prevented from having a sense of discomfort.

Note that the information processing apparatus 1 according to the present embodiment may make the thresholds for increasing resolution and the thresholds for decreasing resolution the same, and the number of the thresholds is not limited to the above example. Further, the resolution determination unit 102 determines resolution by the comparison between a change in the position or the posture of the user 700 and the thresholds. However, the resolution determination unit 102 may determine resolution using, for example, a calculation formula or the like that determines the resolution from a change in the position or the posture of the user 700. Alternatively, the resolution determination unit 102 may have a table showing the relationships between a change in the position or the posture of the user 700 and resolution in advance and determine resolution from the relationships.

Further, the resolution determination unit 102 increases and decreases the first resolution, the second resolution, and the third resolution in vertical and horizontal directions at the same ratio according to changes. However, the resolution determination unit 102 may change the increasing and decreasing ratios of resolution in the vertical direction and resolution in the horizontal direction according to, for example, the ratio of motion in the vertical direction to the ratio of motion in the horizontal direction of the user 700. In addition, the resolution determination unit 102 may increase and decrease resolution only in the vertical direction or resolution only in the horizontal direction according to changes. For example, when it is detected from information regarding acceleration detected by the sensor unit 12 that the user 700 is walking, the resolution determination unit 102 may decrease resolution only in the vertical direction.

Drawing Unit 104

The drawing unit 104 has a frame buffer and performs drawing on the frame buffer on the basis of resolution specified by the resolution determination unit 102.

Display Control Unit 106

The display control unit 106 enlarges or reduces the readout region of the above frame buffer to the size of the display unit 16 on the basis of resolution specified by the resolution determination unit 102 to control the display of the display unit 16. Thus, the virtual object 800 corresponding to resolution determined by the resolution determination unit 102 is displayed on the display unit 16.

Figure 4:
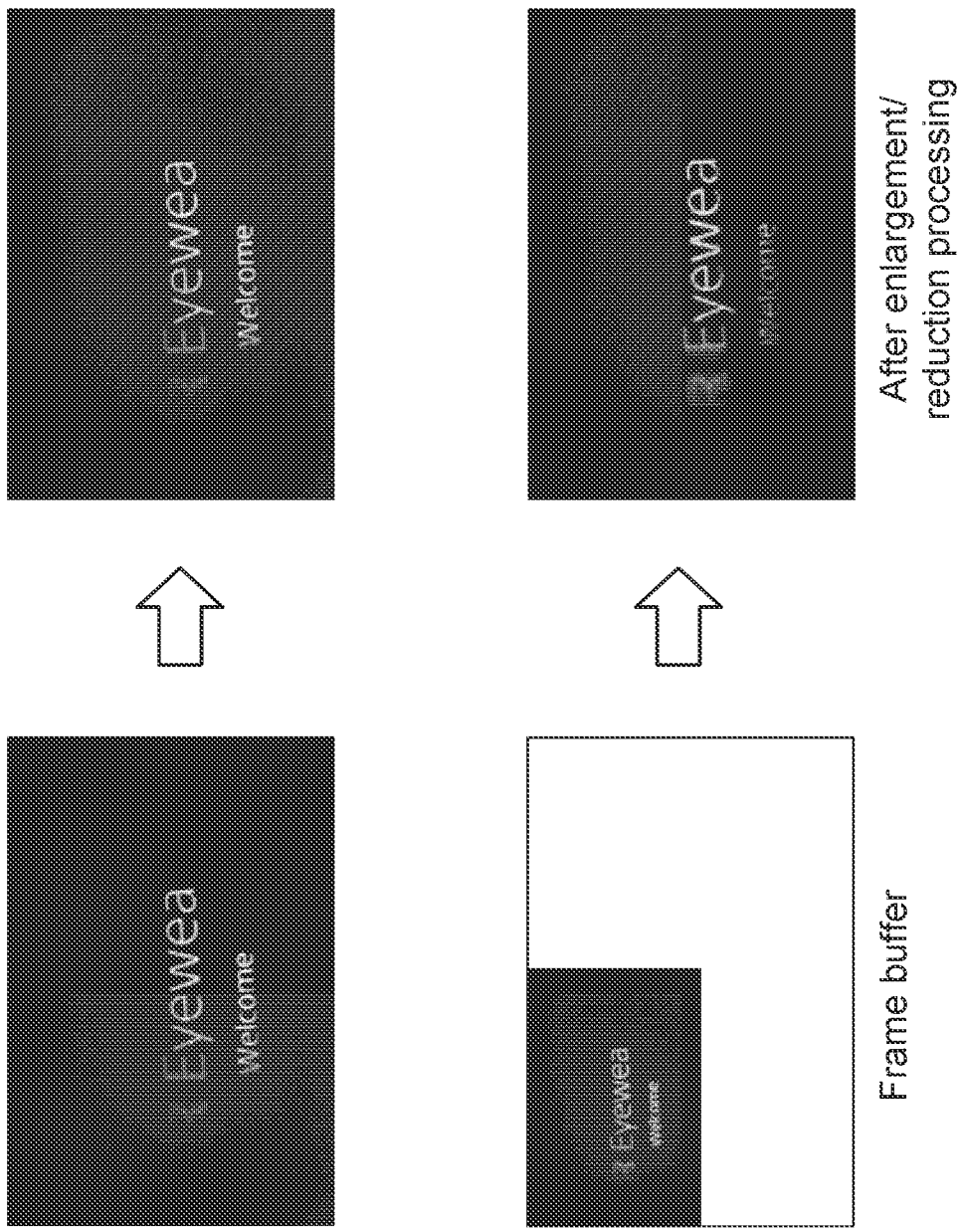
FIG. 4 is a conceptual view for describing the size change operation of a display control unit 106 according to the embodiment.

FIG. 4 is a conceptual view for describing the size change operation of the display control unit 106. The left side of FIG. 4 shows a state in which the drawing unit 104 draws an image in the frame buffer. For example, the upper left part of FIG. 4 shows a state in which the image is drawn with the first resolution (1280×720 pixels), and the lower left part thereof shows a state in which the image is drawn with the third resolution (640×360 pixels). The display control unit 106 performs control to display the images of the frame buffer according to the device size of the display unit 16. That is, the resolution determination unit 102 performs control to display the image of the first resolution (1280×720 pixels) at the upper left part of FIG. 4 that is drawn in the frame buffer at the same size on the display unit 16 and performs control to display the image of the third resolution (640×360 pixels) at the lower left part of FIG. 4 that is drawn in the frame buffer at a size enlarged twice in a vertical direction and twice in a horizontal direction as shown in the lower right part of FIG. 4.

(Sensor Unit 12)

The sensor unit 12 has the function of acquiring various information regarding the user 700 or an environment (real space) around the user 700. As shown in FIG. 2, the sensor unit 12 mainly includes, for example, the outward-looking camera 120, the inward-looking camera 122, the microphone 124, the inertial measurement unit 126, an infrared sensor 128, a direction sensor 130, the position determination unit 132, and a biosensor 134. Note that the sensors described above are given only as an example, and the present embodiment is not limited to the sensors. Further, each of the various sensors provided in the sensor unit 12 may include a plurality of sensors. The details of the respective sensors included in the sensor unit 12 will be described below.

Outward-Looking Camera 120 and Inward-Looking Camera 122

As described above, the outward-looking camera 120 captures images of real space around the user 700, and the inward-looking camera 122 captures images of facial expressions or the like of the user 700, and then the outward-looking camera 120 and the inward-looking camera 122 outputs the captured images to the control unit 10 described above. Specifically, the outward-looking camera 120 and the inward-looking camera 122 have a lens system including an imaging lens, an aperture, a zoom lens, a focus lens, or the like and a driving system that causes the lens system to perform a focus operation or a zoom operation. In addition, each of the outward-looking camera 120 and the inward-looking camera 122 has a solid-state imaging element array or the like that photoelectrically converts imaging light obtained by the above lens system to generate an imaging signal. Note that the solid-state imaging element array may be realized by, for example, a CCD (Charge Coupled Device) sensor array or a CMOS (Complementary Metal Oxide Semiconductor) sensor array.

Note that in the present embodiment, the control unit 10 may use the outward-looking camera 120 as a stereo camera including a pair of right and left cameras, measure the distance between a user and a prescribed position with the stereo camera, and estimate a change in the position or the posture of the user from the result of the measurement and a change in acceleration measured by the inertial measurement unit 126.

Microphone 124

The microphone 124 collects the sound of the user 700 or an environment around the user 700 and outputs information regarding the collected sound to the control unit 10. For example, the microphone 124 collects the sound of instructions given by the user 700 and outputs the collected sound to the control unit 10. For example, the control unit 10 is capable of recognizing instructions from the user 700 by analyzing information regarding sound output from the microphone 124.

Inertial Measurement Unit 126

The inertial measurement unit 126 calculates a three-dimensional angular speed and acceleration with a three-axis gyro and a three-axis accelerometer. The comparison between the time-series data of the acceleration of the user 700 detected by the inertial measurement unit 126 allows the calculation of a change in acceleration. The control unit 10 is capable of calculating a change in the position or the posture of the user 700 on the basis of a change in the acceleration.

Infrared Sensor 128

The infrared sensor 128 detects infrared rays. For example, the comparison between the time-series data of the infrared sensor 128 allows the estimation of a change in the position or the posture of the user 700. Note that the comparison between time-series data of a laser range scan (not shown) also allows the estimation of a change in the position or the posture of the user 700. Then, the control unit 10 is capable of calculating a change in the position or the posture of the user 700 on the basis of the changes in the position or the posture of the user 700.

Direction Sensor 130 and Position Determination Unit 132.

The direction sensor 130 is realized by, for example, a three-axis geomagnetic sensor (compass) and detects an absolute direction (direction). Note that the absolute direction here represents a direction in a world coordinate system (north, south, east, and west) in real space.

The position determination unit 132 detects the absolute position of the information processing apparatus 1 (the user 700) on the basis of a signal acquired from an outside. Note that the absolute position here represents a position in a world coordinate system (longitude and latitude) in real space. Specifically, the position determination unit 132 is realized by, for example, a GPS (Global Positioning System) determination unit, receives electric waves from a GPS satellite to detect a position at which the information processing apparatus 1 (the user 700) exists, and outputs information regarding the detected position to the control unit 10. Further, the position determination unit 132 may include a unit that detects a position by performing transmission/reception, short-range communication, or the like with, for example, Wi-Fi (Wireless Fidelity, ™), Bluetooth™, a mobile phone, a PHS (Personal Handy-phone System), a smart phone, or the like, besides a GPS. The control unit 10 is capable of calculating a change in the position or the posture of the user 700 on the basis of, for example, an absolute direction detected by the direction sensor 130 and an absolute direction detected by the position determination unit 132.

Biosensor 134

The biosensor 134 detects various biological information regarding the user 700. Specifically, the biosensor 134 is directly or indirectly attached to, for example, a part of the body of the user 700 and includes one sensor or a plurality of sensors that measures the heart rates, the blood pressures, the brain waves, the breathing, the sweating, the myoelectric potentials, the skin temperatures, the skin electric resistances, or the like of the user 700. The biosensors 134 output detected biological information to the control unit 10.

Other Sensors

In addition, the sensor unit 12 according to the present embodiment may include a temperature sensor (not shown) that detects the temperatures of environments around the user 700, an illumination sensor (not shown) that detects the brightness of environments around the user 700, or the like, besides the sensors described above. In addition, the sensor unit 12 may include various sensors such as an air pressure sensor (not shown) that detects the atmospheric pressure of environments around the user 700 and an electric wave sensor (not shown) that detects electric waves.

(Storage Unit 14)

The storage unit 14 stores programs or parameters used when the control unit 10 described above performs respective functions. For example, the storage unit 14 stores a recognition algorithm used for processing in the information acquisition unit 100, the resolution determination unit 102, the drawing unit 104, and the display control unit 106, thresholds used in the resolution determination unit 102, or the like in a threshold table.

(Display Unit 16) The display unit 16 is realized by, for example, a lens part (an example of a see-through-type display) that performs display using a hologram optical technology, a liquid crystal display (LCD) unit, an OLED (Organic Light Emitting Diode) unit, or the like.

(Speaker 18)

The speaker 18 reproduces a sound signal or the like according to the control of the control unit 10 described above. For example, the speaker 18 is realizable by a pair of earphone speakers (not shown) corresponding to the right and left ears of the user 700.

(Communication Unit 20)

The communication unit 20 is a communication module used to perform the transmission and reception of data with other apparatuses in a wired/wireless fashion. The communication unit 20 is capable of performing communication with external equipment directly or via a network access point (not shown) on the basis of a system such as a wired LAN (Local Area Network), a wireless LAN, Wi-Fi™, infrared communication, Bluetooth™, and short-range/non-contact communication. Note that the communication unit 20 may be used as an electric wave sensor that detects electric waves.

(Operation Input Unit 22) The operation input unit 22 is realized by operation members (not shown) having a physical structure such as switches, buttons, and levers. For example, the user 700 is allowed to perform desired input on the information processing apparatus 1 by performing an operation on the operation input unit 22. Further, the content of an operation input through the operation input unit 22 may be displayed by the display unit 16 described above.

SUMMARY

The configuration of the information processing apparatus 1 according to the present embodiment is described above. However, the detailed configuration of the information processing apparatus 1 according to the present embodiment is not limited to the example shown in FIG. 2. For example, at least a part of the processing of the control unit 10 of the information processing apparatus 1 may be performed by a server (not shown) on a cloud connected via the communication unit 20.

<Display Example of Virtual Object According to Embodiment>

The detailed configuration of the information processing apparatus 1 according to the present embodiment is described above. Next, a display example of a virtual object by the information processing apparatus 1 will be described with reference to FIGS. 5A and 5B to FIG. 7.

Figure 5A:
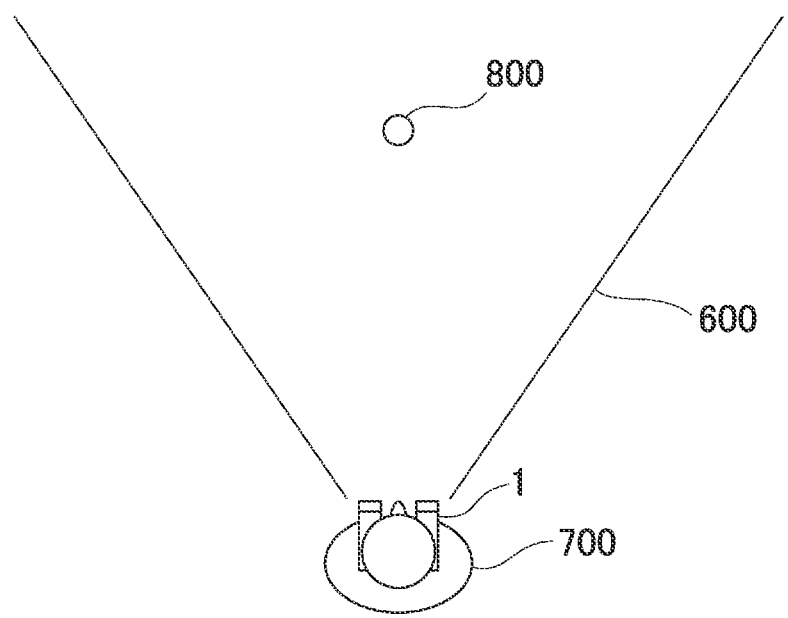
FIG. 5A is a plan view (part 1) schematically showing an example of a state in which a user 700 is seeing real space via the information processing apparatus 1.
Figure 5B:
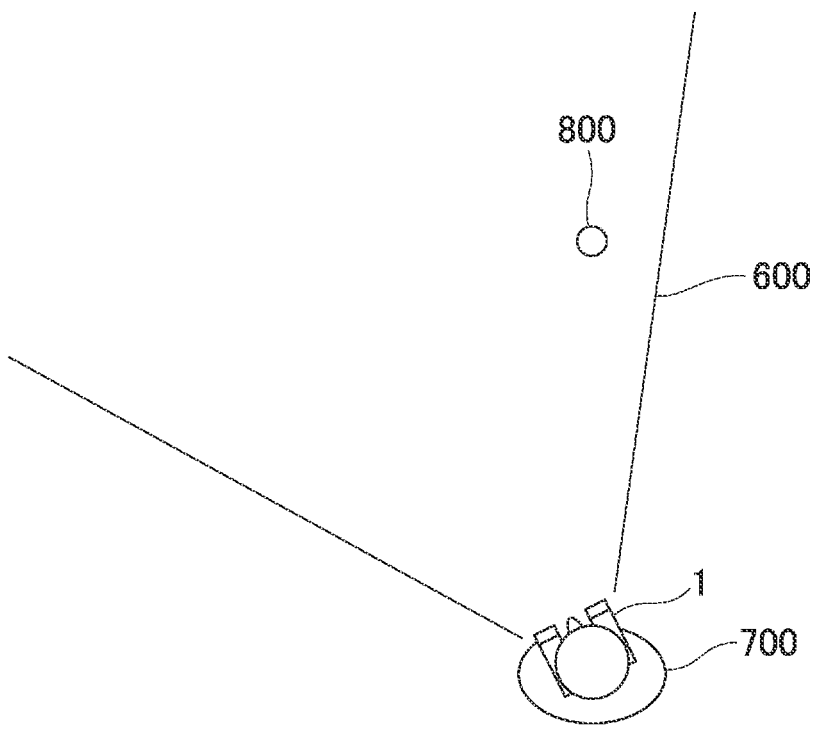
FIG. 5B is a plan view (part 2) schematically showing an example of a state in which the user 700 is seeing the real space via the information processing apparatus 1.
Figure 6A:
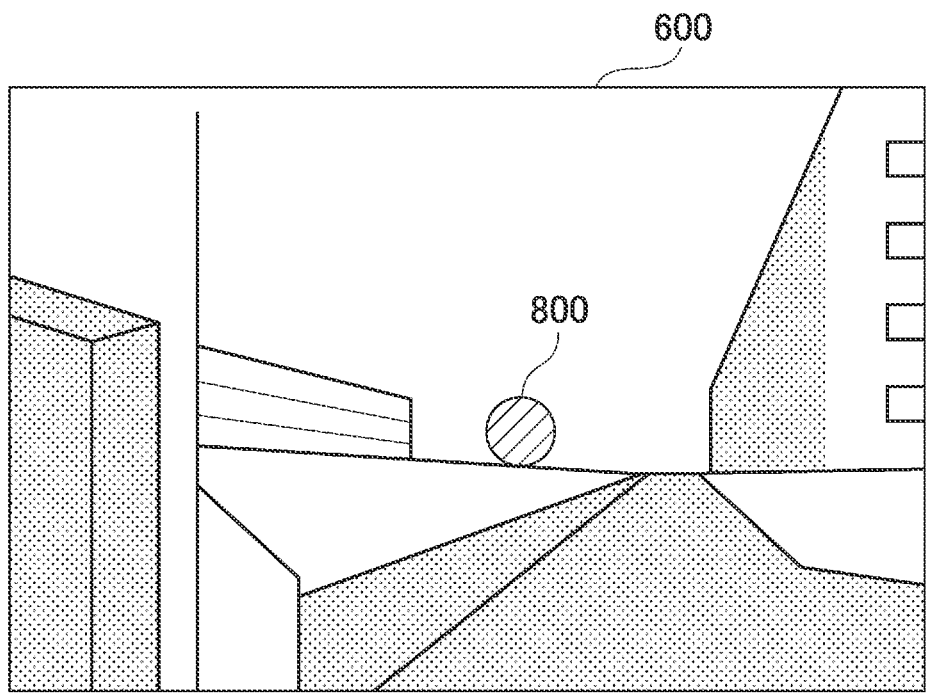
FIG. 6A is a front view (part 1) schematically showing an example of a state (image) in which the user 700 has seen the real space via the information processing apparatus 1.
Figure 6B:
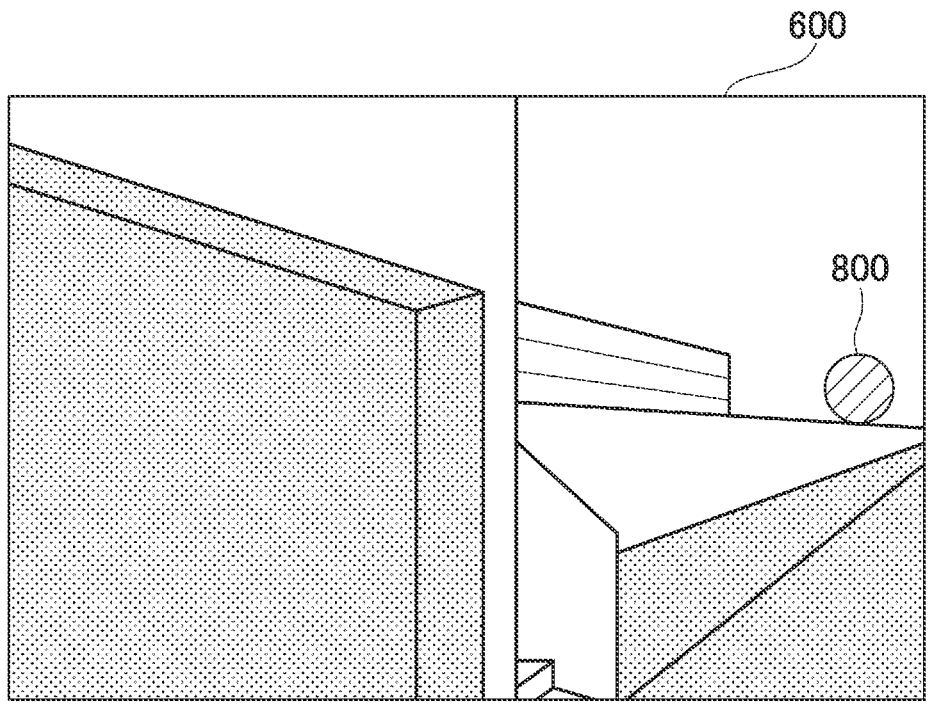
FIG. 6B is a front view (part 2) schematically showing an example of a state (image) in which the user 700 has seen the real space via the information processing apparatus 1.

For example, when it is detected by the control unit 10 that the user 700 has changed his/her position or posture, the information processing apparatus 1 according to the present embodiment is capable of displaying the virtual object 800 on the display unit 16, while decreasing the display resolution of the display unit 16, that is, the resolution of the virtual object 800 during the period of the change. The information processing apparatus 1 displays the virtual object 800 in a state of being superimposed on real space. FIGS. 5A and 5B are plan views (top views) schematically showing an example of a state in which the user 700 is seeing the real space via the information processing apparatus 1. FIG. 5A shows a state in which the user 700 is seeing a first direction, and FIG. 5B shows a state in which the user 700 is seeing a second direction after turning his/her head to the left side. In FIGS. 5A and 5B, symbol 600 shows the range of a visual field in which the user 700 is seeing the real space via the information processing apparatus 1. FIGS. 6A and 6B are front views schematically showing an example of a state (image) in which the user 700 has seen the real space via the information processing apparatus 1. FIG. 6A corresponds to FIG. 5A, and FIG. 6B corresponds to FIG. 5B.

In an example shown in FIGS. 5A and 6A, the user 700 is seeing the virtual object 800 as if the virtual object 800 existed in the real space at a position nearly the center of the visual field 600 and away from the user 700 by a prescribed distance. Then, when the user 700 turns the head to the left side and is put in a state in which the user 700 sees the second direction, the user 700 sees the virtual object 800 as if the virtual object 800 existed in the real space at a position on the right side of the visual field 600 and away from the user 700 by a prescribed distance.

Figure 7:
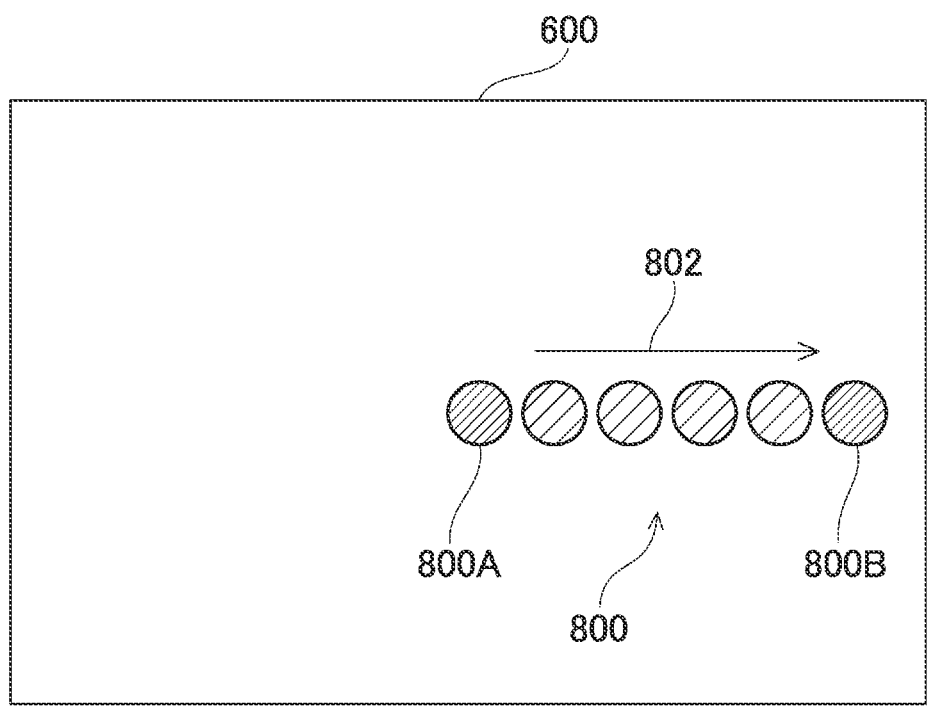
FIG. 7 is a front view showing the state of the relative movement of a virtual object 800 inside a visual field 600 from a state shown in FIG. 6A to a state shown in FIG. 6B.

FIG. 7 shows the state of the movement of the virtual object 800 from the state in which the user 700 is seeing the first direction to the state in which the user 700 sees the second direction, that is, the relative movement of the virtual object 800 inside the visual field 600 from the state shown in FIG. 6A to the state shown in FIG. 6B. As shown in FIG. 7, the virtual object 800 relatively moves inside the visual field 600 along a direction indicated by arrow 802 from a position 800A to a position 800B. The information processing apparatus 1 according to the present embodiment calculates, for example, the movement speed of the virtual object 800 inside the visual field 600 to estimate a speed at which the user 700 turns the head, that is, a change in the position or the posture of the user 700.

The information processing apparatus 1 according to the present embodiment displays the virtual object 800 on the display unit 16 with maximum resolution (for example, 1280×720 pixels) when the user 700 is put in a stationary state. When the user is in motion, that is, when the user is turning the head, the information processing apparatus 1 displays the virtual object 800 on the display unit 16 with resolution (the second resolution (960×540 pixels) or the third resolution (640×360 pixels)) lower than that of the stationary state. The density of oblique lines drawn in the virtual object 800 in FIGS. 6A and 6B and FIG. 7 shows the level of the resolution.

Then, the information processing apparatus 1 changes the extent of the resolution depending on, for example, whether the speed at which the user 700 turns the head is low or high. The information processing apparatus 1 displays the virtual object 800 with, for example, the resolution of 960×540 pixels when the speed is low. The information processing apparatus 1 displays the virtual object 800 with, for example, the resolution of 640×360 pixels when the speed of the change is high.

Note that the information processing apparatus 1 estimates the speed at which the user 700 turns the head, that is, a change in the posture of the user 700 himself/herself in the above example. However, the information processing apparatus 1 is also capable of similarly estimating a speed at which the virtual object 800 comes away from or comes close to the user 700, or moves to the right and left sides or the like inside the visual field 600, that is, a change in the position of the user 700 himself/herself. Further, the information processing apparatus 1 is also capable of similarly estimating both a change in the position of the user 700 and a change in the posture of the user 700. In the present embodiment, the changes will be collectively called motion information.

The information processing apparatus 1 according to the present embodiment estimates motion information regarding the user 700 on the basis of the difference between a first position of the virtual object 800 displayed at a first timing and a second position of the virtual object 800 displayed at a second timing later than the first timing, for example, a timing after a first display frame.

Note that the information processing apparatus 1 may estimate motion information regarding the user 700 in units of frame but may estimate the motion information regarding the user 700 in units of time or in another unit.

Further, such a frame unit, time, or the like may be configured to be dynamically changed according to the battery amount, the heat generation temperature, or the like of the information processing apparatus 1. In addition, the information processing apparatus 1 may be configured to be capable of arbitrarily setting a frame unit or time, while seeing the virtual object 800 when the user 700 is, for example, in motion.

As described above, the information processing apparatus 1 according to the present embodiment determines the resolution of the display unit 16, that is, the resolution of the virtual object 800 on the basis of estimated motion information and displays the virtual object 800 on the display unit 16, that is, displays the virtual object 800 in a state of being superimposed on real space.

<Information Processing Method According to Embodiment>

Figure 8:
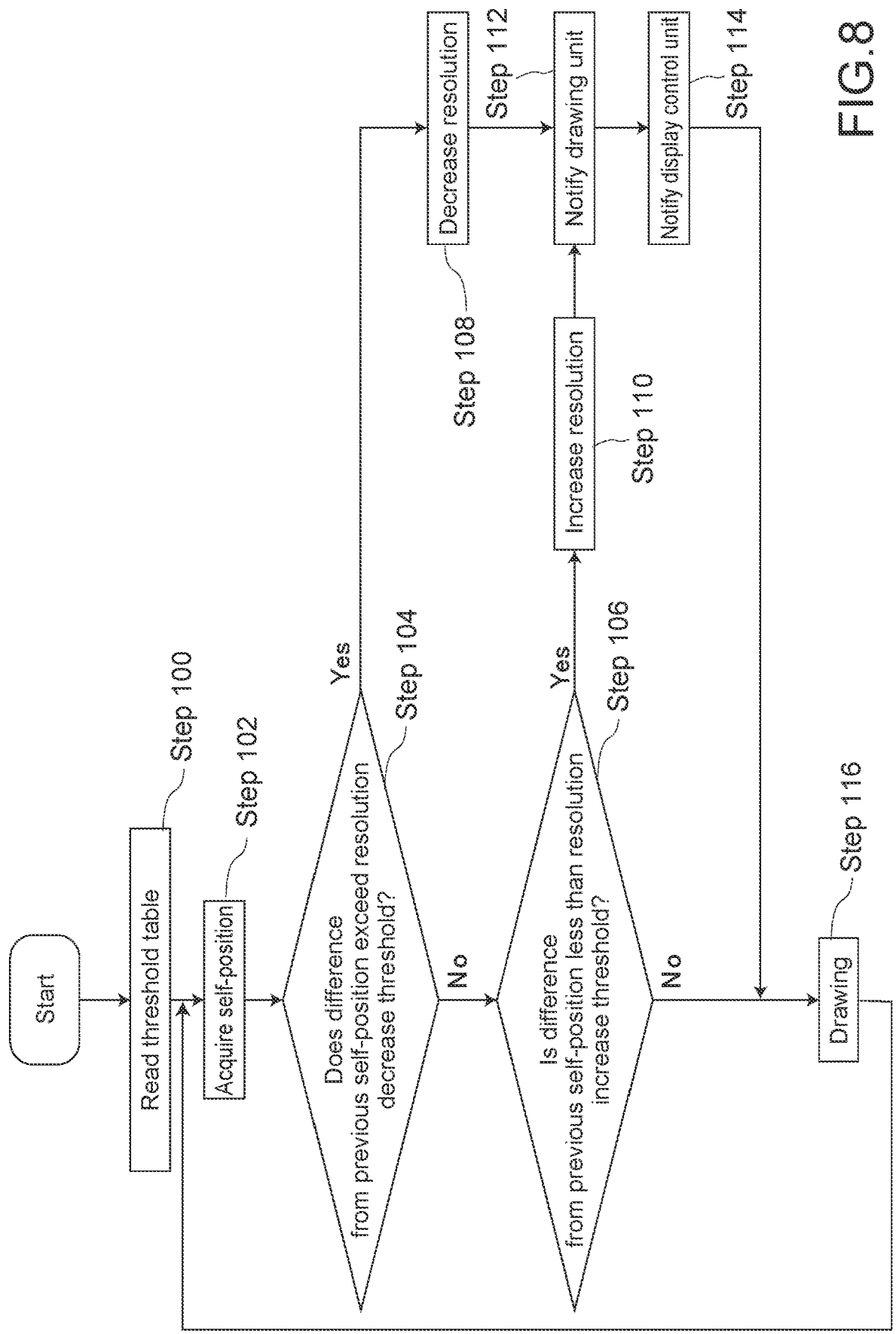
FIG. 8 is a flowchart showing a processing flow according to the embodiment.

The display example of the virtual object 800 according to the present embodiment is described above. Next, an information processing method according to the present embodiment will be described with reference to FIG. 8. FIG. 8 is a flowchart showing a processing flow according to the present embodiment. As shown in FIG. 8, the information processing method according to the present embodiment includes a plurality of steps of step S100 to step S109. The details of the respective steps included in the method according to the present embodiment will be described below. Note that the information processing apparatus 1 performs the following flow (from step 102 to step 116) for each display frame of the virtual object 800 that is displayed and repeatedly performs the flow every time a display frame changes.

(Step S100)

The resolution determination unit 102 reads the first threshold $\alpha_1$, the second threshold $\alpha_2$, the third threshold $\beta_3$, and the fourth threshold $\beta_2$ from the threshold table stored in the storage unit 14.

(Step S102)

The information acquisition unit 100 calculates and estimates the self-position and the posture of the user 700 from data acquired from the outward-looking camera 120 that is a stereo camera and the inertial measurement unit (IMU) 126 that will be described later of the sensor unit 12. The self-position and the posture are calculatable from the ranging result of the outward-looking camera 120 that is a stereo camera and the measurement result of the inertial measurement unit (IMU) 126 after the real world is, for example, recognized from the image data of the outward-looking camera 120.

Further, the information acquisition unit 100 calculates a display distance and a direction (the posture of the user 700) from the user 700 to the display position of the virtual object 800. The display distance and the direction of the virtual object 800 are calculatable on the basis of, for example, a display position defined in advance by an application that displays the virtual object 800 and information regarding the self-position and the posture of the information processing apparatus 1 (the user 700) that is acquired from the above outward-looking camera 120 and the inertial measurement unit (IMU) 126.

Note that the virtual object 800 is displayed on the display unit 16 on the basis of the self-position and the posture of the user 700 and the display distance and the direction from the user 700 to the display position of the virtual object 800 that are calculated as described above.

(Step 104)

The resolution determination unit 102 determines whether a difference in the self-position and the posture of the user 700 that are calculated in step S102 from a previous frame, that is, a change in the self-position and the posture of the user 700 exceeds the resolution decrease thresholds ($\alpha_1$ and $\alpha_2$) read in step 100. When the difference in the self-position and the posture from the previous frame exceeds the resolution decrease thresholds ($\alpha_1$ and $\alpha_2$), the processing proceeds to step 108. Otherwise, the processing proceeds to step 106.

(Step S106)

The resolution determination unit 102 determines whether the difference in the self-position and the posture of the user 700 that are calculated in step S102 from the previous frame, that is, the change in the self-position and the posture of the user 700 is less than the resolution increase thresholds ($\beta_1$ and $\beta_2$) read in step 100. When the difference in the self-position and the posture from the previous frame is less than the resolution increase thresholds ($\beta_1$ and $\beta_2$), the processing proceeds to step 110. Otherwise, the processing proceeds to step 116.

(Step 108)

When the resolution of the previous frame is the first resolution (1280×720 pixels) and the difference in the self-position and the posture from the previous frame exceeds the resolution decrease threshold $\alpha_1$, the resolution determination unit 102 makes a determination to decrease the resolution from the first resolution (1280×720 pixels) to the second resolution (960×540 pixels). When the resolution of the previous frame is the first resolution (1280×720 pixels) or the second resolution (960×540 pixels) and the difference in the self-position and the posture from the previous frame exceeds the resolution decrease threshold $\alpha_2$, the resolution determination unit 102 makes a determination to decrease the resolution from the first resolution (1280×720 pixels) or the second resolution (960×540 pixels) to the third resolution (640×360 pixels). Then, the processing proceeds to step 112.

(Step 110)

When the resolution of the previous frame is the second resolution (960×540 pixels) or the third resolution (640×360 pixels) and the difference in the self-position and the posture from the previous frame is less than the resolution increase threshold $\beta_1$, the resolution determination unit 102 makes a determination to increase the resolution from the second resolution (960×540 pixels) or the third resolution (640×360 pixels) to the first resolution (1280×720 pixels). When the resolution of the previous frame is the third resolution (640×360 pixels) and the difference in the self-position and the posture from the previous frame exceeds the resolution increase threshold $\beta_{2f}$ the resolution determination unit 102 makes a determination to increase the resolution from the third resolution (640×360 pixels) to the second resolution (960×540 pixels). Then, the processing proceeds to step 112.

(Step 112, Step 114, and Step 116)

The resolution determination unit 102 notifies the drawing unit 104 and the display control unit 106 of the resolution determined in step 108 or step 110. The drawing unit 104 performs drawing on the frame buffer on the basis of the resolution specified by the resolution determination unit 102. The display control unit 106 enlarges or reduces the readout region of the frame buffer to the size of the display unit 16 on the basis of the resolution specified by the resolution determination unit 102 and controls the display of the display unit 16.

Thus, the virtual object 800 corresponding to the resolution determined by the resolution determination unit 102 is displayed on the display unit 16.

Note that although described above, the information processing apparatus 1 performs the above flow (from step 102 to step 116) for each display frame of the virtual object 800 that is displayed and repeatedly performs the flow every time a display frame changes.

CONCLUSION

In such an information processing apparatus, a drawing load increases as an object is expressed in a more realistic way. Accordingly, a drawing time per unit time becomes longer as an object is expressed in a more realistic way, which in turn reduces a frame rate. For example, a reduction in quality such as a dropping frame is caused in animation. In addition, a great amount of the resource of a processor is requested as an object is expressed in a more realistic way, which in turn increases a calorific value. For example, the processor stops, or a user faces an increased risk for burning. Further, a great amount of the resource of the processor is requested, which in turn increases power consumption per unit time and heavily consumes a battery.

The information processing apparatus 1 according to the present embodiment is made with attention paid to the fact that, compared with a case in which the user 700 is seeing the virtual object 800 while being put in a stationary state, the user 700 does not visually recognize the details of the virtual object 800 in a case in which the user 700 is in motion, for example, a case in which the user 700 is running, a case in which the user 700 is turning the head, or the like. Therefore, the information processing apparatus 1 reduces the resolution of the virtual object 800 when the user 700 is in motion, expands the range of a reduction in the resolution of the virtual object 800 according to a speed at which the user 700 is in motion, and reduces a drawing load. Thus, the information processing apparatus 1 reduces a drawing load while maintaining realistic expressions for the user 700 and lessens the extent of a problem resulting from the drawing load. Thus, the information processing apparatus 1 is capable of shortening a drawing time per unit time, preventing a reduction in a frame rate, decreasing the calorific value of a processor to reduce the stop of the processor or the risk of burning, and decreasing power consumption per unit time to suppress the consumption of a battery.

Actually, when the resolution of a virtual object is decreased for each of a case in which a user sees the virtual object in a stationary state and a case in which the user sees the same virtual object while walking, it can be confirmed that the user understands a difference in drawing quality by carefully seeing the virtual object in the stationary state but has a difficulty in understanding the difference in drawing quality while walking. In other words, it can be said that a realistic expression is maintained even if the resolution is decreased.

Further, actually, when the processing time of Fragment Shader is decreased as the resolution of a frame buffer is decreased in the information processing apparatus 1, the processing time of the fragment shader is shortened with a decrease in the resolution. However, the decrease in the resolution completely stops at a prescribed processing time, for example, at about 10 ms. This is because time-consuming processing such as State Chang and glClear exists regardless of the resolution. Accordingly, the information processing apparatus 1 according to the present embodiment may set a threshold to the lower limit of resolution. For example, the threshold may be the value of the resolution with which a processing time for prescribed image processing such as the processing time of Fragment Shader is not decreased even if the resolution is decreased.

Note that in the present disclosure, examples of the image quality of a virtual object that is changed can include, besides the resolution of the virtual object, the texture (the feel of the virtual object), the display concentration, the transparency, the brightness, and the number of colors of the virtual object.

OTHER EMBODIMENTS

The present disclosure is not limited to the embodiment described above but may realize various other embodiments.

For example, in the information processing apparatus 1 shown in FIGS. 1 and 2, the storage unit 14 may have a virtual object retention table that retains, in advance, a plurality of virtual objects representing the same image and each having different image quality, the resolution determination unit 102 may select one of the plurality of virtual objects retained in the virtual object retention table on the basis of estimated motion information, and the display control unit 106 may control the display of the virtual object selected by the resolution determination unit 102.

Here, the virtual object retention table retains in advance, for example, a mipmap obtained by subjecting an original virtual object (for example, a virtual object with maximum resolution) to mipmapping. Further, the virtual object retention table may retain in advance, for example, a plurality of types of compression texture images generated from an original virtual object (for example, a virtual object with maximum resolution). Further, the virtual object retention table may retain in advance, for example, the above mipmap, the plurality of types of compression texture images, or the like and selectively use the same according to, for example, the prescribed attribute of a virtual object.

In the information processing apparatus 1 according to the embodiment, the drawing unit 104 that performs drawing on a frame buffer on the basis of resolution specified by the resolution determination unit 102 becomes unnecessary. The display control unit 106 only has to control the display of a virtual object selected by the resolution determination unit 102. Accordingly, the embodiment allows a further reduction in a drawing load.

The description described above exemplifies a case in which the technology according to the present disclosure is applied to a smart eyeglass having a transparent display. However, the technology is not limited to the case in the embodiment of the present disclosure. For example, the technology is applicable to, for example, a HMD having a nontransparent-type display, VR (Virtual Reality), an information processing apparatus such as a smart phone. In the case of a smart phone, the technology according to the present disclosure is applicable to, for example, the application of a navigation. For example, a smart phone may detect its motion information and only has to control the resolution of a virtual object on the map of a navigation on the basis of the motion information.

Further, the above embodiment exemplifies a case in which a HMD operates standalone. However, a HMD and a smart phone may cooperate with each other to realize the technology according to the present disclosure. For example, for example, a HMD may have a transparent display unit, and the control unit of a smart phone connected to the HMD in a wired or wireless fashion may detect a change in the position or the posture of a user and also perform the determination of resolution or the like.

<<Example of Hardware Configuration>>

Figure 9:
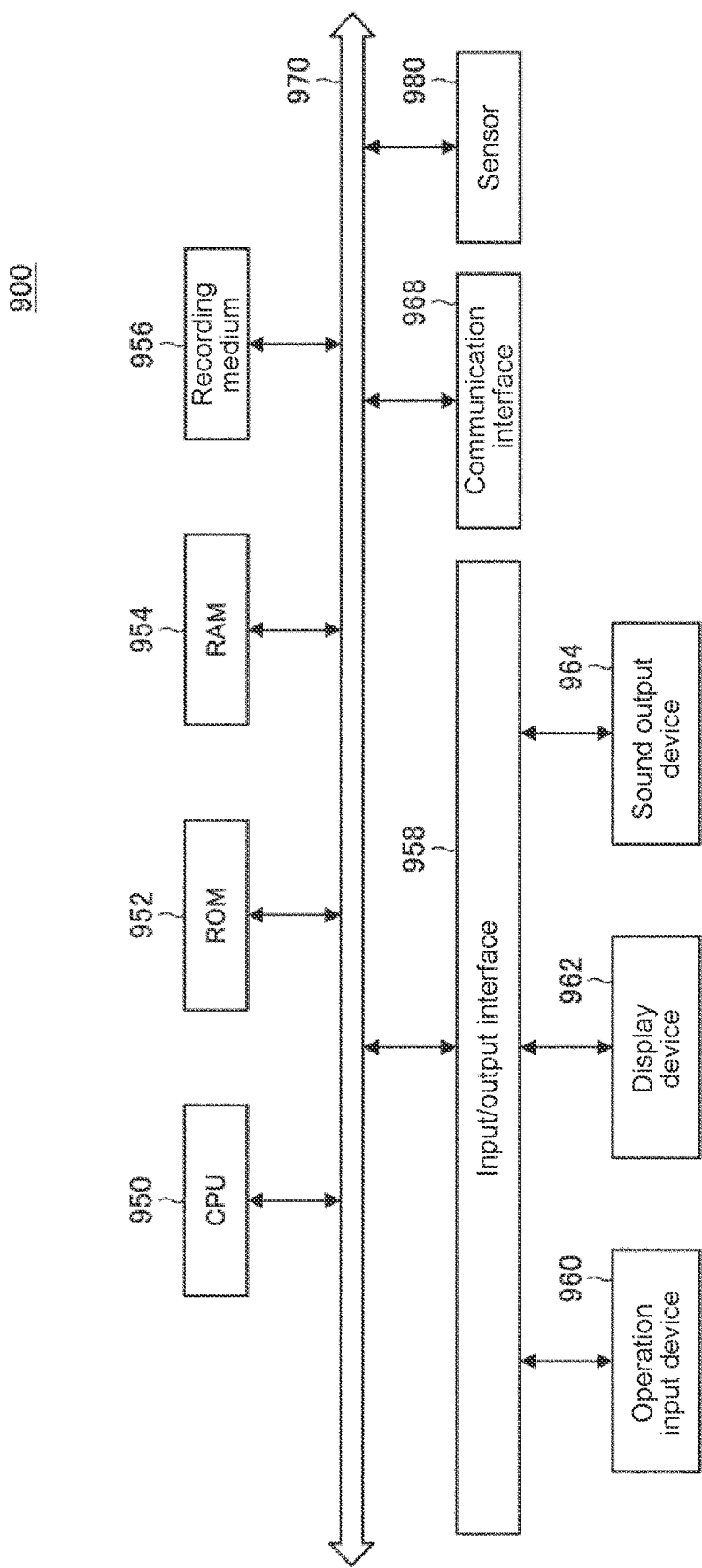
FIG. 9 is a block diagram showing an example of the hardware configuration of an information processing apparatus 900 according to an embodiment of the present disclosure.

FIG. 9 is a block diagram showing an example of the hardware configuration of an information processing apparatus 900 according to an embodiment of the present disclosure. In FIG. 9, the information processing apparatus 900 shows an example of the hardware configuration of the information processing apparatus 1 described above.

The information processing apparatus 900 has, for example, a CPU 950, a ROM 952, a RAM 954, a recording medium 956, an input/output interface 958, and an operation input device 960. In addition, the information processing apparatus 900 has a display device 962, a sound output device 964, a communication interface 968, and a sensor 980. Further, the information processing apparatus 900 connects the respective constituting elements to each other through, for example, a bus 970 serving as a data transmission path.

(CPU 950)

The CPU 950 includes, for example, one or more processors including a computation circuit such as a CPU and a GPU, various processing circuits, or the like and functions as a control unit (for example, the control unit 10 described above) that controls the whole information processing apparatus 900. Specifically, the CPU 950 fulfills, for example, the function of the information acquisition unit 100, the information acquisition unit 100, the resolution determination unit 102, the drawing unit 104, the display control unit 106, or the like described above in the information processing apparatus 900.

(ROM 952 and RAM 954)

The ROM 952 stores control data such as a program and a computation parameter used by the CPU 950. The RAM 954 temporarily stores, for example, a program or the like performed by the CPU 950.

(Recording Medium 956)

The recording medium 956 functions as the storage unit 14 described above and stores, for example, various data such as data relating to the information processing method according to the present embodiment and various applications. Here, examples of the recording medium 956 include a magnetic recording medium such as a hard disk and a non-volatile memory such as a flash memory. Further, the recording medium 956 may be attachable to and detachable from the information processing apparatus 900.

(Input/Output Interface 958, Operation Input Device 960, Display Device 962, and Sound Output Device 964)

The input/output interface 958 connects, for example, the operation input device 960, the display device 962, or the like. Examples of the input/output interface 958 include a USB (Universal Serial Bus) terminal, a DVI (Digital Visual Interface) terminal, a HDMI (High-Definition Multimedia Interface) (TM) terminal, and various processing circuits.

The operation input device 960 is connected to the input/output interface 958 inside the information processing apparatus 900.

The display device 962 functions as, for example, the display unit 16 described above, is provided in the information processing apparatus 900, and is connected to the input/output interface 958 inside the information processing apparatus 900. Examples of the display device 962 include a liquid crystal display and an organic EL display (Organic Electro-Luminescence Display).

The sound output device 964 functions as, for example, the speaker 18 described above, is provided in, for example, the information processing apparatus 900, and is connected to the input/output interface 958 inside the information processing apparatus 900.

Note that the input/output interface 958 is, of course, connectable to an external device such as an operation input device (for example, a keyboard, a mouse, or the like) outside the information processing apparatus 900 and an external display device.

Further, the input/output interface 958 may be connected to a drive (not shown). The drive is a reader/writer for a removable recording medium such as a magnetic disk, an optical disk, and a semiconductor memory and included in or externally attached to the information processing apparatus 900. The drive reads information recorded on an attached removable recording medium and outputs the read information to the RAM 954. Further, the drive is capable of writing information in an attached removable recording medium.

(Communication Interface 968)

The communication interface 968 functions as the communication unit 20 for performing communication with other external apparatuses in a wired or wireless fashion via, for example, a communication network (not shown) (or directly). Here, examples of the communication interface 968 include a communication antenna and a RF (Radio Frequency) circuit (wireless communication), an IEEE802.15.1 port and a transmission and reception circuit (wireless communication), an IEEE802.11 port and a transmission and reception circuit (wireless communication), and a LAN (Local Area Network) terminal and a transmission and reception circuit (wired communication).

(Sensor 980)

The sensor 980 functions as the sensor unit 12 described above. In addition, the sensor 980 may include various sensors such as an illumination sensor.

An example of the hardware configuration of the information processing apparatus 900 is described above. Note that the hardware configuration of the information processing apparatus 900 is not limited to the configuration shown in FIG. 9. Specifically, the above respective constituting elements may include general-purpose members or may include hardware specialized in the functions of the respective constituting elements. Such a configuration can be appropriately changed according to an occasional technical level in the operation of the information processing apparatus 900.

For example, the information processing apparatus 900 may not include the communication interface 968 when performing communication with an external apparatus or the like via a connected external communication device or when performing processing standalone. Further, the communication interface 968 may have a configuration capable of performing communication with one or more external apparatuses on the basis of a plurality of communication systems. Further, the information processing apparatus 900 is capable of having, for example, a configuration not including the recording medium 956, the operation input device 960, or the like.

Further, the information processing apparatus 900 according to the present embodiment may be applied to a system including a plurality of apparatuses assuming connection to a network (or communication between respective apparatuses) like, for example, cloud computing. That is, the information processing apparatus 900 according to the present embodiment described above is realizable as, for example, an information processing system that performs processing relating to the information processing method according to the present embodiment with a plurality of apparatuses.

<<Supplemental Note>>

Further, the embodiments described above can include, for example, a program for causing a computer to function as an information processing apparatus according to the present embodiment and a non-transitory tangible medium on which the program is recorded. Further, the program may be distributed via a communication line (also including wireless communication) such as the Internet.

In addition, the respective steps in the processing of the respective embodiments described above may not be necessarily performed in the order described herein. For example, the respective steps may be performed in an order appropriately changed. Further, the respective steps may be performed partially in parallel or may be separately performed instead of being performed in a time series. In addition, the respective steps may not be necessarily performed according to the method described herein but may be performed by, for example, other function blocks according to other methods.

The suitable embodiments of the present disclosure are described in detail above with reference to the accompanying drawings, but the technical scope of the present disclosure is not limited to such examples. It is obvious that persons with ordinary knowledge in the technical field of the present disclosure could conceive various modified examples within the range of the technical spirit described in claims and understood that such modified examples belong to the technical scope of the present disclosure as a matter of course.

Further, the effect described in the present specification is given only for illustration or exemplification and should not be interpreted in a limited way. That is, the technology according to the present disclosure can produce other effects obvious to persons skilled in the art from the description of the present specification together with or instead of the above effect.

Note that the following configurations also belong to the technical range of the present disclosure.

(1) An information processing apparatus including:

an acquisition unit that acquires motion information regarding a user;

a determination unit that determines image quality of a virtual object on the basis of the motion information acquired by the acquisition unit; and a display control unit that controls display of the virtual object on the basis of the image quality determined by the determination unit.

(2) The information processing apparatus according to (1), in which the acquisition unit acquires a change in a display position of the virtual object as the motion information regarding the user.

(3) The information processing apparatus according to (2), in which the acquisition unit acquires the motion information regarding the user on the basis of a difference between a first display position of the virtual object displayed at a first timing and a second display position of the virtual object displayed at a second timing later than the first timing.

(4) The information processing apparatus according to (1), in which the acquisition unit acquires the motion information regarding the user on the basis of information regarding a measured position of the user or information regarding a measured posture of the user.

(5) The information processing apparatus according to any of (1) to (4), in which the determination unit determines resolution of the virtual object as the image quality of the virtual object on the basis of the motion information.

(6) The information processing apparatus according to any of (1) to (5), in which on the basis of the motion information, the determination unit determines one of texture, display concentration, transparency, brightness, and the number of colors of the virtual object as the image quality of the virtual object.

(7) The information processing apparatus according to (5), further including a drawing unit that performs drawing on a frame buffer on the basis of the resolution of the virtual object that is determined by the determination unit, in which on the basis of the resolution determined by the determination unit, the display control unit controls a size of the display of the virtual object drawn on the frame buffer.

(8) The information processing apparatus according to (5) or (7), in which the determination unit determines vertical resolution or horizontal resolution of the virtual object on the basis of the motion information acquired by the acquisition unit.

(9) The information processing apparatus according to any of (1) to (4), further including:

a virtual object retention table that retains, in advance, a plurality of the virtual objects representing the same image and each having different image quality, in which the determination unit selects one of the plurality of the virtual objects retained in the virtual object retention table on the basis of the motion information acquired by the acquisition unit, and the display control unit controls the display of the virtual object selected by the determination unit.

(10) The information processing apparatus according to (9), in which the virtual object retention table retains, in advance, a mipmap obtained by subjecting the virtual objects to mipmapping.

(11) The information processing apparatus according to (8) or (9), in which the virtual object table retains, in advance, a plurality of types of compression texture images generated from the virtual objects.

(12) The information processing apparatus according to any of (1) to (11), further including a threshold table that retains a first threshold for the motion information and a second threshold for the motion information that is smaller than the first threshold, the first threshold being used by the determination unit to make a determination to decrease the image quality of the virtual object from first image quality to second image quality, the second threshold being used by the determination unit to make a determination to increase the image quality of the virtual object from the second image quality to the first image quality, in which the determination unit determines the image quality of the virtual object on the basis of a comparison between the motion information acquired by the acquisition unit, and the first threshold and the second threshold.

(13) The information processing apparatus according to any of (1) to (12), further including a transparent-type display unit that displays the virtual object of which the display is controlled by the display control unit.

(14) The information processing apparatus according to any of (1) to (12), further including a nontransparent-type display unit that displays the virtual object of which the display is controlled by the display control unit, the virtual object being displayed in a state of being superimposed on another image.

(15) The information processing apparatus according to any of (1), in which the acquisition unit acquires information regarding a motion of an HMD (head-mounted display) as the motion information regarding the user on the basis of output data of a sensor included in the HMD, and the display control unit controls the display of the virtual object on a display unit included in the HMD.

(16) An information processing method including:
acquiring motion information regarding a user;
determining image quality of a virtual object on the basis of the acquired motion information; and
controlling display of the virtual object on the basis of the determined image quality.

(17) A program that causes a computer to perform a process comprising:
acquiring motion information regarding a user;
determining image quality of a virtual object on the basis of the acquired motion information; and
controlling display of the virtual object on the basis of the determined image quality.

Note that it is also possible to combine at least two feature portions together among the feature portions of the respective embodiments described above.

REFERENCE SIGNS LIST 1 information processing apparatus
10 control unit
12 outward-looking camera
12 sensor unit
14 storage unit
16 display unit
100 information acquisition unit
100 step
102 resolution determination unit
104 drawing unit
106 display control unit
120 outward-looking camera
126 inertial measurement unit
128 infrared sensor
700 user
800 virtual object
900 information processing apparatus
S100 step
S102 step
S109 step
$\alpha_1$ first threshold (resolution decrease threshold)
$\alpha_2$ second threshold (resolution decrease threshold)
$\beta_1$ third threshold (resolution increase threshold)
$\beta_2$ fourth threshold (resolution increase threshold)

The invention claimed is:

1. An information processing apparatus comprising:
an acquisition unit configured to acquire motion information regarding a user;
a determination unit configured to determine image quality of a virtual object based on the motion information acquired by the acquisition unit; and
a display control unit configured to control display of the virtual object based on the image quality determined by the determination unit,
wherein the motion information used to determine the image quality of the virtual object includes a speed of the virtual object relative to the user,
wherein based on the motion information including the speed of the virtual object relative to the user, the determination unit determines the image quality of the virtual object by determining a resolution of the virtual object,
wherein the determination unit determines to decrease the resolution of the virtual object from a first resolution to a second resolution based on a first threshold for the motion information,
wherein the determination unit determines to increase the resolution of the virtual object from the second resolution to the first resolution based on a second threshold for the motion information,
wherein the second threshold for the motion information is smaller than the first threshold for the motion information, and
wherein the acquisition unit, the determination unit, and the display control unit are each implemented via at least one processor.

2. The information processing apparatus according to claim 1,
wherein the acquisition unit is further configured to acquire a change in a display position of the virtual object as the motion information regarding the user.

3. The information processing apparatus according to claim 2,
wherein the acquisition unit acquires the motion information regarding the user based on a difference between a first display position of the virtual object displayed at a first timing and a second display position of the virtual object displayed at a second timing later than the first timing.

4. The information processing apparatus according to claim 1,
wherein the acquisition unit acquires the motion information regarding the user based on information regarding a measured position of the user or information regarding a measured posture of the user.

5. The information processing apparatus according to claim 1,
wherein based on the motion information, the determination unit further determines the image quality of the virtual object by determining at least one of texture, display concentration, transparency, brightness, or a number of colors of the virtual object.

6. The information processing apparatus according to claim 1, further comprising:
a drawing unit configured to perform drawing on a frame buffer based on the resolution of the virtual object that is determined by the determination unit,
wherein based on the resolution determined by the determination unit, the display control unit controls a size of the display of the virtual object drawn on the frame buffer, and
wherein the drawing unit is implemented via at least one processor.

7. The information processing apparatus according to claim 1,
wherein the determination unit determines at least one of vertical resolution or horizontal resolution of the virtual object based on the motion information acquired by the acquisition unit.

8. The information processing apparatus according to claim 1, further comprising:
a virtual object retention table configured to retain, in advance, a plurality of the virtual objects representing the same image and each having different image quality,
wherein the determination unit selects one of the plurality of the virtual objects retained in the virtual object retention table based on the motion information acquired by the acquisition unit,
wherein the display control unit controls the display of the virtual object selected by the determination unit, and
wherein the virtual object retention table is implemented via at least one non-transitory computer-readable storage medium.

9. The information processing apparatus according to claim 8,
wherein the virtual object retention table retains, in advance, a mipmap obtained by subjecting the virtual objects to mipmapping.

10. The information processing apparatus according to claim 8,
wherein the virtual object table retains, in advance, a plurality of types of compression texture images generated from the virtual objects.

11. The information processing apparatus according to claim 1, further comprising:
a threshold table configured to retain a first threshold for the motion information and a second threshold for the motion information that is smaller than the first threshold, the first threshold being used by the determination unit to make a determination to decrease the image quality of the virtual object from first image quality to second image quality, the second threshold being used by the determination unit to make a determination to increase the image quality of the virtual object from the second image quality to the first image quality,
wherein the determination unit determines the image quality of the virtual object based on a comparison between the motion information acquired by the acquisition unit, and the first threshold and the second threshold, and
wherein the threshold table is implemented via at least one non-transitory computer-readable storage medium.

12. The information processing apparatus according to claim 1, further comprising:
a transparent-type display configured to display the virtual object of which the display is controlled by the display control unit.

13. The information processing apparatus according to claim 1, further comprising:
a nontransparent-type display configured to display the virtual object of which the display is controlled by the display control unit, the virtual object being displayed in a state of being superimposed on another image.

14. The information processing apparatus according to claim 1,
wherein the acquisition unit acquires information regarding a motion of an HMD (head-mounted display) as the motion information regarding the user based on output data of a sensor included in the HMD, and
wherein the display control unit controls the display of the virtual object on a display unit included in the HMD.

15. An information processing method comprising:
acquiring motion information regarding a user;
determining image quality of a virtual object based on the acquired motion information; and
controlling display of the virtual object based on the determined image quality,
wherein the motion information used to determine the image quality of the virtual object includes a speed of the virtual object relative to the user, and
wherein based on the motion information including the speed of the virtual object relative to the user, the image quality of the virtual object is determined by determining a resolution of the virtual object,
wherein the image quality of the virtual object is determined by decreasing the resolution of the virtual object from a first resolution to a second resolution based on a first threshold for the motion information,
wherein the image quality of the virtual object is determined by increasing the resolution of the virtual object from the second resolution to the first resolution based on a second threshold for the motion information, and wherein the second threshold for the motion information is smaller than the first threshold for the motion information.

16. A non-transitory computer-readable storage medium having embodied thereon a program, which when executed by a computer causes the computer to execute a method, the method comprising:

acquiring motion information regarding a user;

determining image quality of a virtual object based on the acquired motion information; and controlling display of the virtual object based on the determined image quality, wherein the motion information used to determine the image quality of the virtual object includes a speed of the virtual object relative to the user, and wherein based on the motion information including the speed of the virtual object relative to the user, the image quality of the virtual object is determined by determining a resolution of the virtual object, wherein the image quality of the virtual object is determined by decreasing the resolution of the virtual object from a first resolution to a second resolution based on a first threshold for the motion information, wherein the image quality of the virtual object is determined by increasing the resolution of the virtual object from the second resolution to the first resolution based on a second threshold for the motion information, and wherein the second threshold for the motion information is smaller than the first threshold for the motion information.

* * * * *